United States Patent [19]

Gorlov

[11] 4,095,423
[45] Jun. 20, 1978

[54] APPARATUS FOR HARNESSING TIDAL POWER

[76] Inventor: Alexander Moiseevich Gorlov, 234 Main St., Medford, Mass. 02155

[21] Appl. No.: 794,239

[22] Filed: May 5, 1977

[51] Int. Cl.² ............................ F15B 1/02; E02B 9/00
[52] U.S. Cl. ........................................ 60/398; 60/408; 61/20
[58] Field of Search ................ 60/325, 369, 370, 398, 60/408, 416; 91/4 R, 5, 218, 315; 61/20; 290/42; 417/100, 330

[56] References Cited

U.S. PATENT DOCUMENTS

| | | | |
|---|---|---|---|
| 610,790 | 9/1898 | Beckers | 417/100 X |
| 2,239,893 | 4/1941 | Jackman | 91/4 R |
| 3,199,417 | 8/1965 | Young et al. | 91/4 R X |
| 3,925,986 | 12/1975 | Barwick | 60/412 X |

Primary Examiner—Edgar W. Geoghegan
Attorney, Agent, or Firm—Weingarten, Maxham & Schurgin

[57] ABSTRACT

An apparatus for harnessing and extracting a portion of the power generated by the rise and fall of ocean tides. A portion of a waterway is dammed and the difference in water levels across the dam provides a pressure differential which, through appropriate valving, feeds two sealed chambers which are used to contain air under positive pressure. The chambers are connected one each to alternate ends of a cylinder for driving a piston and rod assembly disposed therein, in reciprocating motion. The dam is comprised of a thin-walled structure which may be either rigid, conventional materials or flexible and flotationally supported.

7 Claims, 10 Drawing Figures

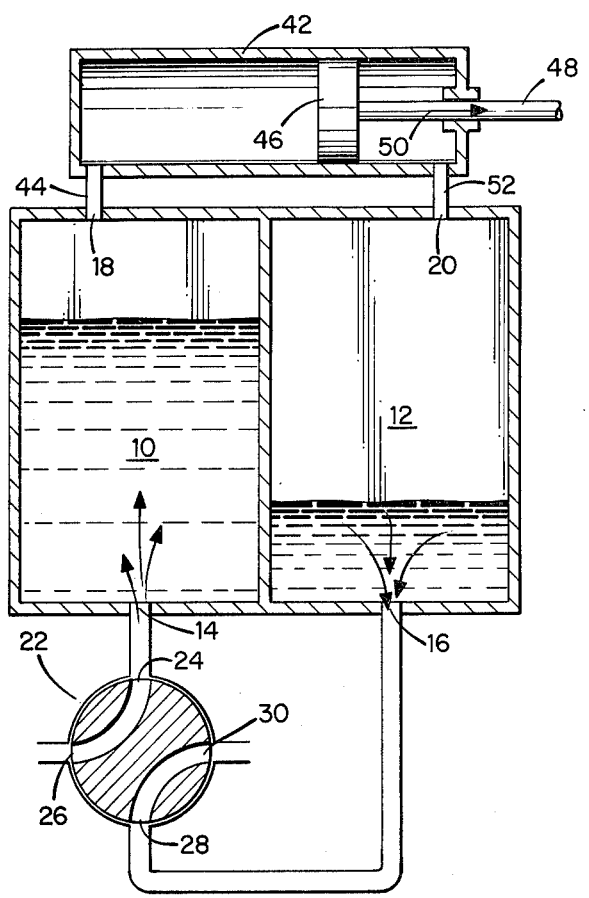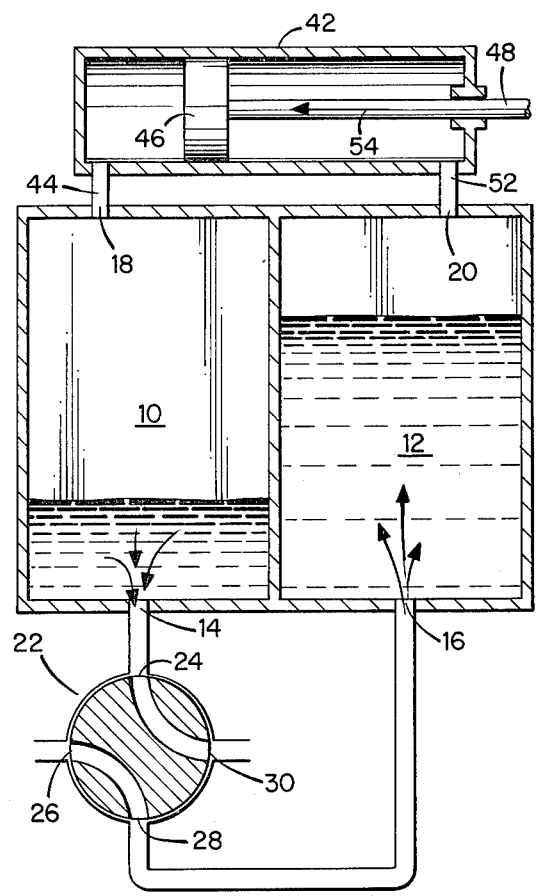
Fig. 1.
Fig. 2.
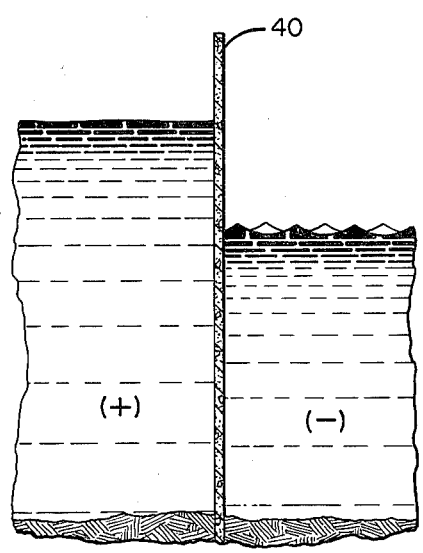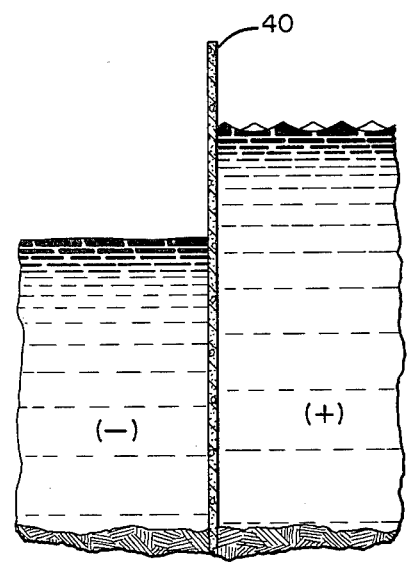
Fig. 3.
Fig. 4.

APPARATUS FOR HARNESSING TIDAL POWER

FIELD OF THE INVENTION

This invention relates in general to devices for deriving useful power from the continuous tidal motion of the oceans and, in particular, to an apparatus for extracting power in readily usable form from tidal motion. Even more precisely, this invention pertains to systems in which the rise and fall of the tides are used to establish cooperating pressure variations in two supplies of air.

BACKGROUND OF THE INVENTION

Several devices for utilizing the rise and fall of the tides or wave action to impart motion to mechanical systems are well known in the prior art. For example, such devices are the subjects of U.S. Pat. Nos. 378,452; 603,314; 1,036,502; 1,455,718; 1,623,341; 2,484,183; 3,268,154; 3,690,790; 3,697,764; and 3,925,986; and of the present applicant's pending U.S. patent application, Ser. No. 781,949, filed Mar. 28, 1977. The last of such listed patents contains a summary description of several of the earlier listed patents and is a particularly useful background reference. Of the aforementioned patents, those not summarized in U.S. Pat. No. 3,925,986 are summarized in the aforementioned pending application, Ser. No. 781,949. This pending application describes an apparatus for extracting power from the tides, the apparatus having a housing mounted on the ocean bed with ports of ingress and egress near the bottom or lower part of the housing, through which tidal waters may flow, valves for permitting low pressure air to be built up in the housing by tides and partial vacuum conditions in response to falling tides, and valving connecting this first housing to a second housing which is divided into two fluid communicating chambers. A float is disposed in each chamber and a rod attached to each of said floats extends through the second housing at a fluid-sealed aperture. The valving controls changes in the atmosphere pressure in the air above the fluid in each of the two chambers of the second housing, causing the floats and float rods to reciprocate and thereby provide usable mechanical output. The reciprocating action is a result of there being a fixed volume of liquid within the second housing, the specific portion of such liquid disposed within each chamber at any instant of time being a function of the relative atmospheric pressures present within the chambers.

Neither the aforementioned patent application nor any of the above-listed patents discloses or suggests the use of a water level differential which may be developed across a dam to provide a pressurized water flow for moving a constant volume of air between two chambers in reciprocating fashion, as in the present invention; likewise, they do not show that such reciprocating volume of air may be used to reciprocate a piston and piston rod to provide mechanically usable power in the manner of this invention. Nor is the use of a flexible, thin-walled material suggested by any of such art as suitable for the principal element of the required dam.

BRIEF SUMMARY OF THE INVENTION

In a preferred embodiment for the present invention, an apparatus for extracting power from the tides is shown having a dam for establishing a water level differential to provide a low pressure water flow, a pair of housings each of which is closed except for a single port for the ingress and egress of water and a single port for the ingress and the egress of air. The two ports for the ingress and egress of water are connected to two ports of a four-port valving means, the other two ports of which are connected one each respectively to water on first and second sides of the dam. The ports for the ingress and egress of air are connected one each to the respective ends of a cylinder wherein a piston and piston rod are disposed; the piston rod passes through one end of the cylinder at a sealed orifice.

The four-port valve has two states. The state or condition of the valve is controlled by the position of the piston and piston rod by any appropriate mechanism such that the valve is in a first state when the piston is travelling in a first direction and is in a second state when the piston is travelling in the opposite direction. Near the piston's end limits of travel in each direction, the state of the valve is switched.

The two chambers should be located below the low tide level to insure that a constant volume of air will be maintained above the water levels therein. The only other elements which need be exposed to the environment, and, in particular, the tide, are the dam and a pair of conduits for connecting two ports of the four-port, two-state valve to the water on the two sides of the dam.

Since only a low pressure water flow is needed in order to make the piston reciprocate, civil engineering construction costs may be kept at a minimum. For example, the dam need only produce about a 1 meter water level differential, or even less, in order to obtain favorable results. This contrasts with conventional approaches to tidal projects wherein dams have had to be designed to withstand the forces of storms and winds as well as the full peak tide level, which may be as much or as ten or more meters. A dam suitable for the present invention could even be constructed using lightweight, flexible, thin-walled plastic films rather than the traditional reinforced concrete and stone materials, as more fully explained below.

BRIEF DESCRIPTION OF THE DRAWINGS

These and other features of the present invention are more fully described below in the detailed description of the preferred embodiment, and in the accompanying drawings of which:

FIGS. 1 and 2 are sectional, schematic illustrations of the two chambers together with the cylinder, piston and piston rod assembly showing the two states of the control valve;

FIGS. 3 and 4 are diagrammatic representations of the water level differential conditions maintained by the dam in response to rising and falling tides;

DETAILED DESCRIPTION OF THE INVENTION

Figure 6:
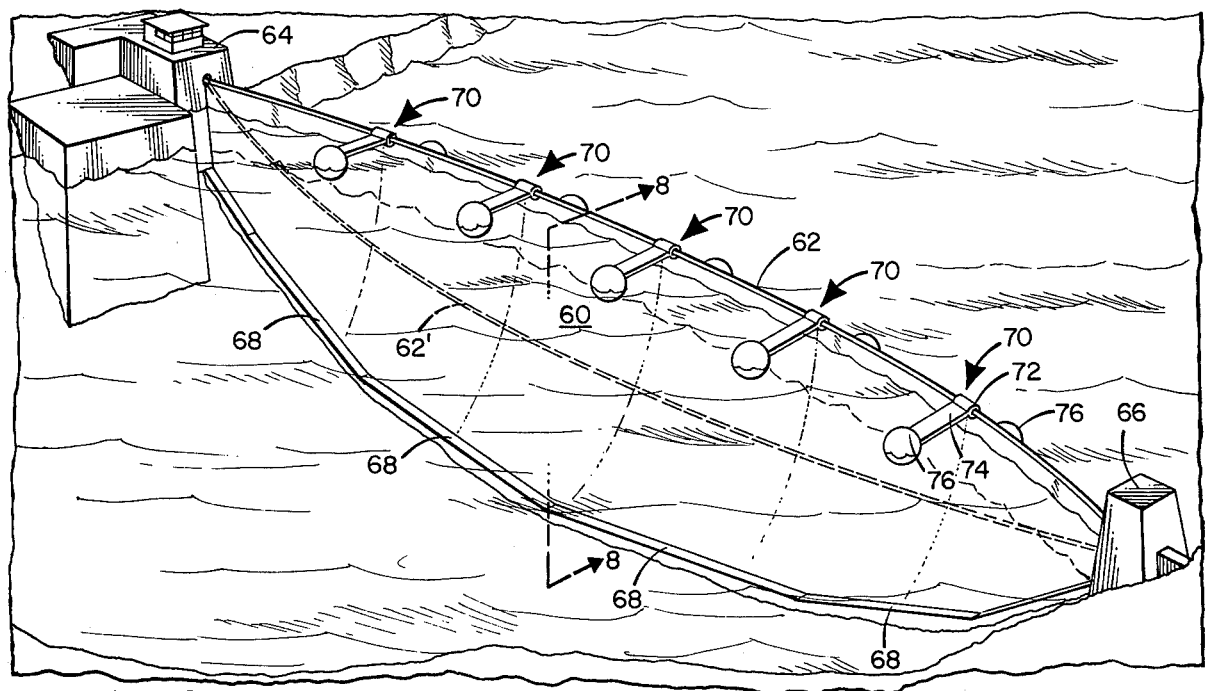
FIG. 6 is a diagrammatic representation of a dam for the present invention, the dam being composed of a plastic film or like material and being suspended from a cable supported by a float.

The present invention contemplates apparatus for harnessing and extracting a portion of power generated by the rise and fall of ocean tides. The operating portion of the present invention is shown in FIGS. 1 and 2. As illustrated, two chambers, indicated generally by the numerals 10 and 12, are provided. The chambers may be entirely separate or they may be constructed, as shown, to share a common wall. Each of chambers 10 and 12 is provided near the bottom thereof with a port (14 and 16, respectively) for the ingress and egress of water. Near the top portions thereof, the two chambers are each provided with a port (18 and 20, respectively) for the ingress and egress of air. Except for the aforementioned pairs of ports, the chambers are otherwise sealed closures.

A four-port, two-state valve, generally designated by the numeral 22, controls the flow of water into and out of chambers 10 and 12. This valve is substantially similar to the control valve described in the present inventor's pending U.S. patent application Ser. No. 781,949 filed Mar. 28, 1977, although in the aforementioned application the valve is used to control the flow of air whereas in the present application it is used to control the flow of water. In FIG. 1, the valve 22 is shown in a first state wherein port 14 of chamber 10 is connected to a first port 24 of the valve, and through a passageway provided in the valve to a second port thereof, 26. Simultaneously, port 16 of chamber 12 is connected to a third port 28 of the valve, through a connecting passage provided by the valve to the fourth port thereof, 30. Ports 26 and 30 of valve 22 are each connected in communication with the water on opposite sides of a dam such as the one shown for illustrative purposes in FIGS. 3 and 4, wherein port 26 would be connected, for example through a conduit, to the water in the left of dam 40 and port 30 to that to the right of the dam, or vice versa.

Referring now to FIGS. 3 and 4, there is shown diagrammatically a dam 40 and the water levels on each side thereof. FIG. 3 illustrates a low tide condition wherein the dam maintains the water to the left at a higher level than the water level represented by the low tide on the right of the dam. (The wavy line on the surface of the water to the right of the dam is intended to show the tidal water.) In FIG. 4, the situation is reversed, representing a high tide, the water to the left of the dam being at a lower level than the now risen tidal water to the right of the dam. The plus (+) symbol in these figures indicates the water of greater surface elevation and, consequently, pressure, while the minus (−) symbol indicates the lower level, lower pressure water.

The two conditions shown in FIGS. 1 and 2 occur both during the rising and falling tide intervals. Assume first, for purposes of explanation, a low tide condition, such as shown in FIG. 3, and the second port 26 of valve 22 being operatively connected to the water to the left of the dam in FIG. 3 and the fourth port 30 of the valve being operatively connected to the body of water to the right of the dam in FIG. 3. The higher pressure water will flow into port 26, through the valve, out port 24 and into port 14, as indicated by the arrows therein, raising the water level in chamber 10. As the water level rises in chamber 10, the air above it is pressurized and pushed out port 18 into cylinder 42 through passage 44 and a corresponding port in the cylinder. The pressurized air entering the cylinder 42 via passage 44 and the associated cylinder port pushes on the bottom of piston 46, causing the piston and piston rod 48 to move toward the opposite end of the cylinder as indicated by arrow 50. Simultaneously, the top of piston 46 compresses the air within cylinder 42 to the right thereof, forcing it out of the cylinder through a port at the right end of the cylinder, via passage 52 and port 20 and into chamber 12. Thus, the pressure imposed upon port 26 of the valve is transmitted, except for losses due to friction, leaks and similar factors, to the surface of the water in chamber 12. The pressure upon the surface of the water in chamber 12 combined with the lower pressure on the right side of the dam 40 results in water flowing out of chamber 12 through port 16, as indicated by the arrows, into port 28 of the valve, through the valve, and out port 30 of the valve into the tidal waterway to the right of the dam.

When piston 46 is near the end of its rightward limit of travel in cylinder 42, the state of valve 22 is switched, as, for example, by rotating the valve member 90° with respect to the ports. No particular mechanism is herein detailed for switching the state of the valve in response to the position of the piston, although a mechanism similar to that disclosed in the aforementioned patent application Ser. No. 781,949 could be used. A number of other mechanisms will undoubtedly be apparent to those skilled in the art, such as a valve driven by an electric motor, the motor being switched in response to the position of the piston.

The condition of the valve having been switched to the second state, reference is now made to FIG. 2 wherein the condition of the valve in such state is shown. It will be appreciated that the higher pressure is now being applied from port 26, through the valve, to port 28 and then into chamber 12 through port 16, causing the water level in chamber 12 to rise, compressing the air above the water therein and pushing the piston in the opposite direction, as indicated by arrow 54. This action compresses the air in the cylinder to the left of the piston, forcing it into chamber 10 and forcing the water out through port 14 into the valve at port 24, through the valve and out port 30 again to the lower pressure water on the right side of the dam 40.

When piston 40 is near the left end of cylinder 42, this condition is detected and responsive thereto the valve 22 is switched back to the first state thereof and the whole process is repeated.

Thus, the effect of the subject apparatus is to allow the water from the high pressure side of the dam to flow through the apparatus and then out to the low pressure side of the dam and in so doing to extract useful work therefrom. When the tide changes, as illustrated in FIG. 4, this remains true without changing any of the apparatus or the connections between elements thereof. All that changes is the direction of water flow through the valve ports, so that instead of water entering port 26 and exiting port 30, the water will now enter port 30 and exit port 26. From within either chamber 10 or 12 there is essentially no way of detecting any difference in operation between rising and falling tides.

Figure 5:
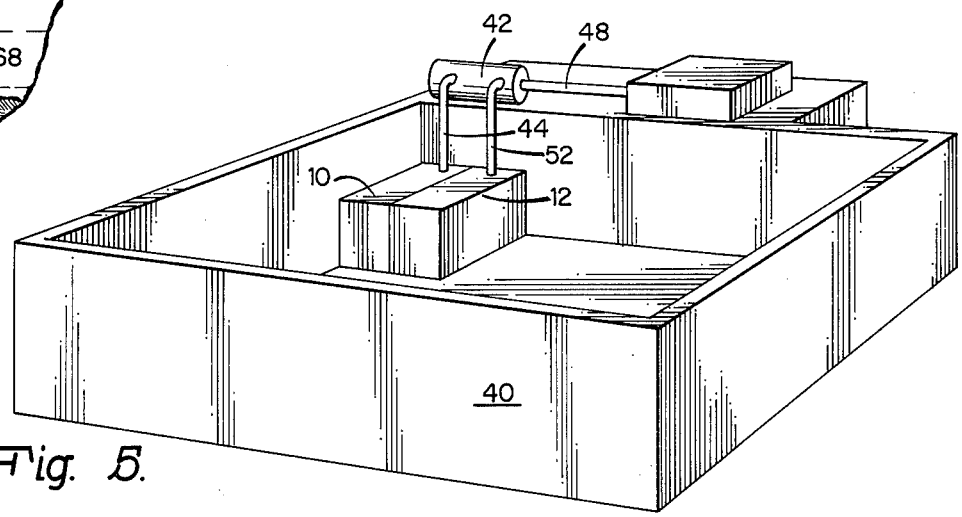
FIG. 5 is a pictorial, prospective view of the exterior of an apparatus for harnessing tidal power according to this invention.

In FIG. 5 there is shown in diagrammatic form one embodiment of the present invention in which a four-sided dam is employed. Chambers 10 and 12 may be located within the dammed area, a conduit being connected from the outside of the dammed enclosure to one of ports 26 or 30 of the valve 22, while the other of such ports may directly communicate with the water within the dammed region. It may be immediately observed that in contrast with the present inventor's pending U.S. patent application, Ser. No. 781,494 and the other prior art cited above, this dammed structure does not require a roof over the four walls and need not contain any significant pressures, having only to withstand a water level differential of about 1 meter. Thus, construction costs for the dam will be considerably less than construction costs for the hermetic main housing of the aforesaid patent application and related prior art.

Figure 7:
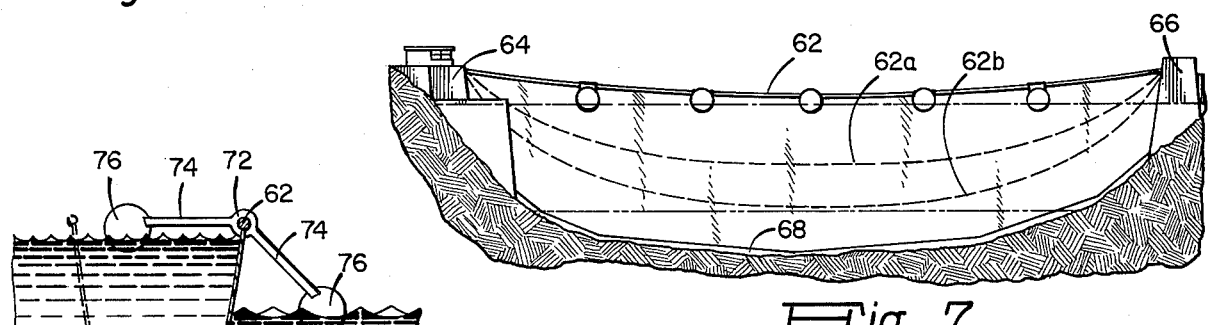
FIG. 7 is a diagrammatic illustration of the dam of FIG. 6 showing how the dam may be successively lowered.
Figure 8:
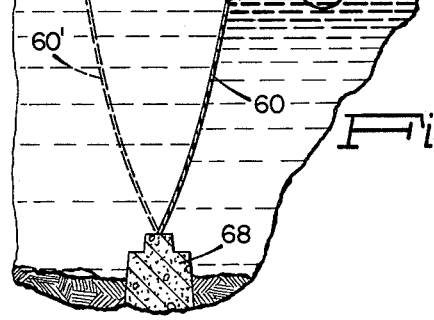
FIG. 8 is a sectional view of the dam of FIG. 6 taken substantially along the line 8-8' of that figure.

An even cheaper structure for purposes of providing the required water level and pressure differential than the conventional dam in FIG. 5 is the one shown in FIGS. 6 through 8. This dam structure basically comprises a sheet 60 of plastic or similar strong, flexible, thin-walled material which is stretched across a channel, inlet, river mouth or similar tidal waterway. The material sheet is suspended from a cable 62 which is supported at either side of the channel by buildings 64 and 66. The bottom of the plastic sheet is anchored to the bottom of the waterway by any suitable means such as beams 68.

A number of float assemblies 70 may optionally be provided in order to use their buoyancy to assist in supporting the cable 62 and to stabilize the top of the plastic film over the water surface independently of the water level differential. Float assemblies 70 are comprised of a sleeve portion 72 and a pair of arms 74 extending radially outward therefrom. The sleeve 72 encloses the cable 62 and is freely rotatable thereabout. A pair of floats 76 is provided for each float assembly 70, the end of each of the float arms 74 opposite the end connected to the sleeve 72 being connected to one of such floats. Thus, one of such floats rests in the body of water to one side of the plastic film while the other float rests in the body of water to the other side of the plastic film.

Figure 10:
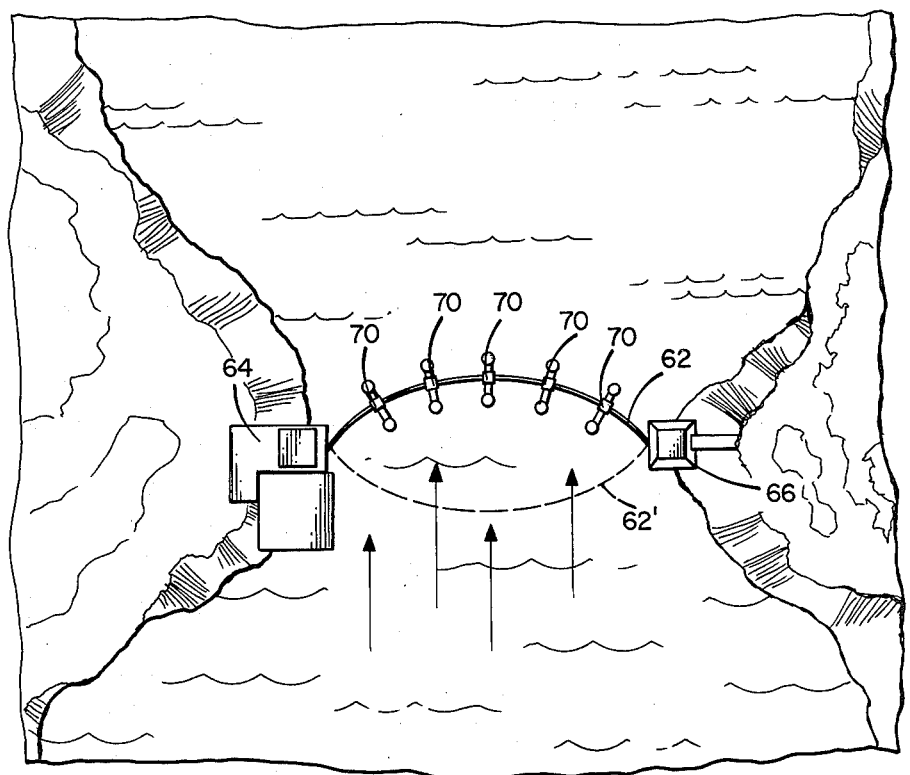
FIG. 10 is a diagrammatic illutration of a top view of a waterway dammed by the structure of FIGS. 6-9.

The dashed lines 78 in FIG. 6 are intended to illustrate the curvature of the surface of the flexible dam with the tide to the right of the dam having fallen below the water level to the left of the dam, as is perhaps better illustrated in FIGS. 8 and 10 wherein the arrows indicate both the direction of the tide and that in which the greater pressure is applied to the dam. With opposite tide conditions, the cable 62 flexes back to the position indicated by the dashed line 62', with corresponding movement of the plastic film to the position indicated by dashed line 60' in FIG. 8.

Figure 9:
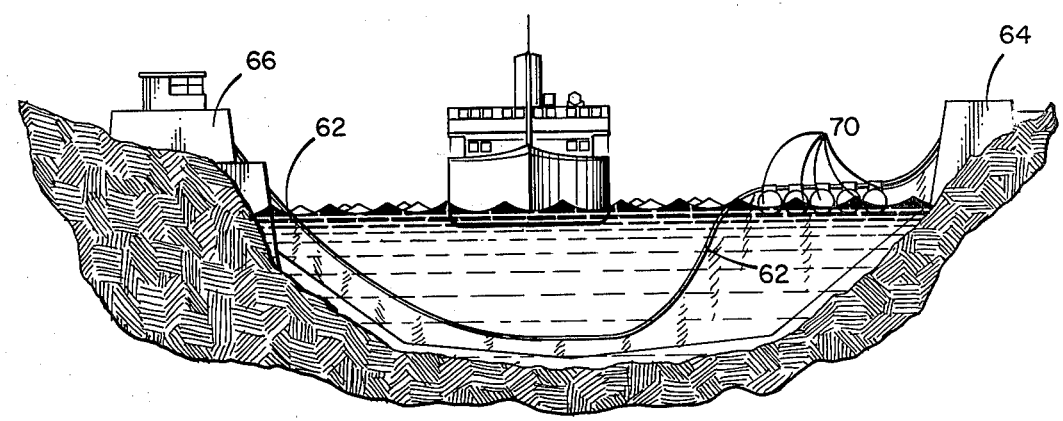
FIG. 9 is a diagrammatic illustration of the dam of FIGS. 6 and 7 showing the dam in a lowered position permitting the passage of ships.

One advantage, other than construction costs, accruing with use of the described flexible, thin-walled dam is that cable 62 can be loosened to cause the plastic film to be lowered, as indicated by dashed lines 62a and 62b in FIG. 7, illustrating two semi-lowered positions of the cable and by FIG. 9, showing how the float assemblies 70 would be moved toward one end of the cable 62 to permit lowering of the remainder of the cable. Thus, ships may be permitted to pass without the need for expensive, special lock structures employed with conventional dam designs, and the film may be lowered in severe weather to prevent structural damage to the dam, etc.

From the foregoing description, it should be understood that the rate at which piston 46 and piston rod 48 reciprocate is a direct function of the magnitude of the pressure differential across the dam. Accordingly, the float-supported plastic film dam is particularly useful for maintaining an upper bound on the pressure differential, merely by adjusting the relative positions of the floats, if that should be desired.

The above thus described embodiments for the present invention are illustrative only, alterations and modifications deemed to be within its scope and spirit. The breadth of the invention is intended to be limited only as defined in the following claims.

What is claimed is:

1. An apparatus for extracting usable power from a tidal water flow, comprising:
    means for creating a low water pressure differential between a first, tidal body of water and a second, non-tidal body of water;
    first and second chambers each having a first port in the upper portion thereof and a second port in the second portion thereof;
    a cylinder having a piston and piston rod disposed therein, the piston rod extending through a wall of the cylinder in a fluid-sealed aperture;
    the cylinder having a first port at a first end thereof and a second port at a second port thereof;
    the first port of the first chamber being connected to the first port of the cylinder and the first port of the second chamber being connected to the second port of the cylinder;
    a multi-state valve for connecting, in a first state, a first port thereof to a second port thereof and a third port thereof to a fourth port thereof and, in the second state, connecting the first port to the fourth port thereof and the second port to the third port thereof;
    one of either the first or third ports of the valve being connected to the second port of the first chamber and the other of such ports of the valve being connected to the second port of the second chamber;
    the valve being in the first state while the piston is moving toward the second end of the cylinder;
    means for switching the valve to the second state thereof when the piston nears the second end of the cylinder;
    the valve being in the second state while the piston is moving toward the first end of the cylinder;
    means for switching the valve to the first state when the piston nears the first end of the cylinder.

2. The apparatus of claim 1 wherein the first and second chambers comprise a single housing having a partition for dividing the housing into two chambers.

3. The apparatus of claim 1 wherein one of either the second or fourth ports of the valve is in communication with the non-tidal body of water and the other of such ports is in communication with the tidal body of water.

4. The apparatus of claim 3 wherein the first and second chambers comprise a single housing having a partition for dividing such housing into two chambers.

5. The apparatus of claim 3 wherein the means for creating a water pressure differential comprises a dam.

6. The apparatus of claim 5 wherein the dam comprises a cable stretched across a tidal waterway and a film of light weight, thin-walled, flexible material suspended therefrom and anchored to the bottom of the waterway.

7. The apparatus of claim 6 further including at least one float assembly for flotationally supporting the cable above the surface of the water on both sides of the dam.

* * * * *